S. P. JOHNSON.
WIND SHIELD WIPER AND GLARE PROTECTOR.
APPLICATION FILED APR. 15, 1919.
1,322,115.
Patented Nov. 18, 1919.
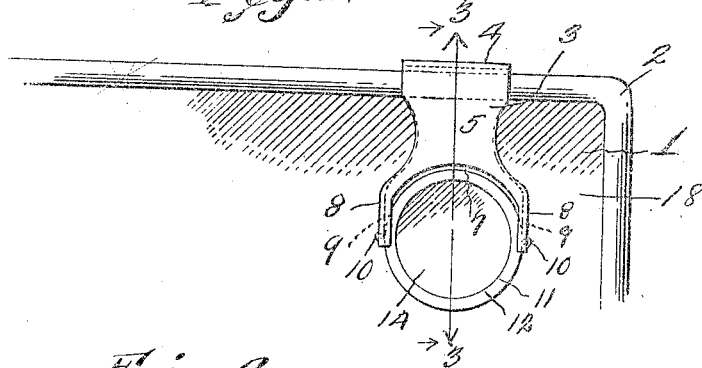
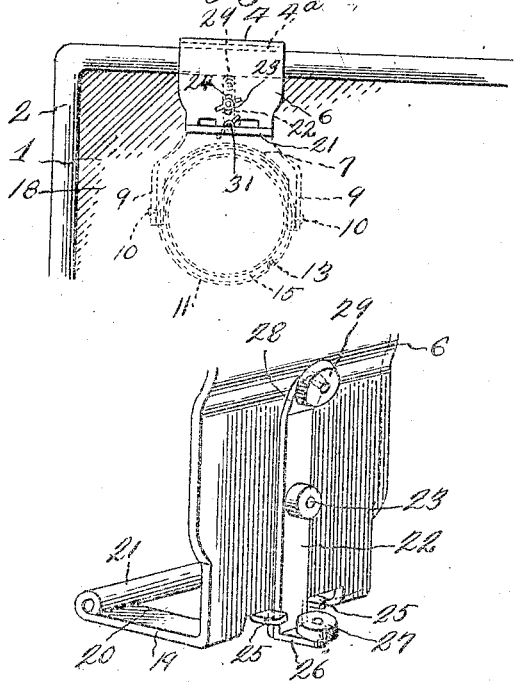
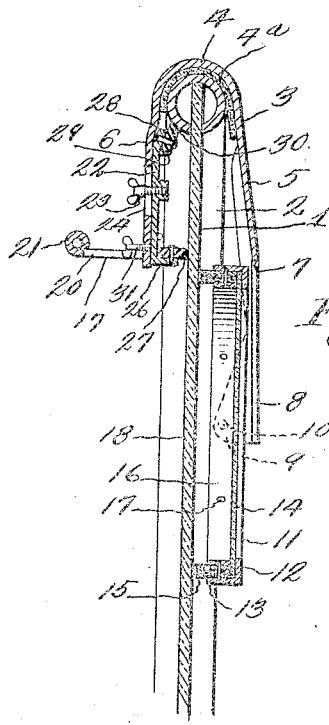
Inventor
Simon P. Johnson
By Philip A. H. Ferrell
Attorney

UNITED STATES PATENT OFFICE.

SIMON P. JOHNSON, OF WESTPOINT, NEBRASKA.

WIND-SHIELD WIPER AND GLARE-PROTECTOR.

1,322,115.  Specification of Letters Patent.  Patented Nov. 18, 1919.

Application filed April 15, 1919. Serial No. 290,181.

*To all whom it may concern:*

Be it known that I, SIMON P. JOHNSON, a citizen of the United States, residing at Westpoint, in the county of Cuming and State of Nebraska, have invented certain new and useful Improvements in Wind-Shield Wipers and Glare-Protectors, of which the following is a specification, reference being had therein to the accompanying drawing.

The invention relates to wind shield cleaners for automobiles and glare protectors, and has for its object to provide a device of this character, wherein it will be possible for the operator of the automobile to wipe the water from the glass of the wind shield without stopping the vehicle, also to prevent effect of the glaring light of an approaching automobile, also to so construct the cleaner so that the same will be capable of being attached to the marginal edge of the wind shield in such a manner that it may be easily and quickly moved along the same, when it is desired to wipe the glass.

A further object is to provide a wiper of this character, wherein the wiper as a whole is capable of longitudinal movement along the marginal edge of a wind shield and to provide means whereby the wiper will be capable of adjustment so that the wiping member will be kept in close contact with the glass, also to provide anti-frictional means whereby the friction on the marginal edge of the wind shield will be reduced to a minimum by means of adjustable rollers, which engage the surface of the glass and the frame of the wind shield.

With the above and other objects in view, the invention resides in the combination and arrangement of parts as hereinafter set forth, described, shown in the drawings and claimed, it being understood that changes in the precise embodiment of the invention may be made, within the scope of what is claimed without departing from the spirit of the invention.

In the drawings:—

Figure 1 is a front elevation of a portion of a wind shield, showing the device applied thereto.

Fig. 2 is a rear elevation of the device, showing the same applied to a wind shield.

Fig. 3 is a vertical sectional view taken on line 3—3 of Fig. 1.

Fig. 4 is a perspective view of the rear portion of the device, showing the adjustable rollers.

Referring to the drawings the numeral 1 designates a portion of a conventional form of wind shield, which is of the usual type used on automobiles and 2 the frame thereof. The wiper 3 is formed from a piece of sheet metal bent upon itself as at 4 so as to provide members 5 and 6, which are adapted to extend downwardly on the outer and inner side of the wind shield. The member 5, which is on the outside of the wind shield is provided with a segmental cut out portion 7, thereby forming arms 8 having ears 9 and pivoted as at 10, between the ears is a ring 11 angular in cross section. The ring 11 comprises the flanges 12 and 13 for holding and maintaining in position a transparent colored member 14, which is preferably made of celluloid. A felt ring 15 is disposed in the ring 11 and in engagement with the flange 13 and is secured in position by means of a ring 16, which is riveted by means of rivets 17, which pass through the felt ring and the flange 13. The outer marginal edge of the felt ring being adapted to engage the surface of the glass 18 of the wind shield.

The member 6 of the wiper extends downwardly on the rear side of the wind shield and is provided with a right angled portion 19, which is cut away as at 20 for the reception of the fingers of the operator's hand when he places the same around the roll 21 for imparting longitudinal movement to the wiper as a whole. A roller plate 22 is provided on the inner face of the member 6 and is vertically adjustable by means of the thumb screw 23 which is vertically adjustable in the slot 24, said roller plate 22 being guided in its vertical movement by means of the lugs 25, which are bent from the lower edge of the member 6. The lower end of the roller plate 22 is provided with a right angled arm 26, on which is rotatably mounted a roller 27 adapted to engage the rear face of the wind shield glass. The upper end of the roller plate is provided with an arm 28, bent from the main body of the plate 22 and rotatably mounted thereon is a roller 29, which engages the upper rail of the frame of the wind shield as at 30. A thumb screw 31 is threaded in the lower end of the member 6 and has its inner end in engagement with the lower end of the roller plate 22 and forms means whereby the lower end of the plate 22, may be forced inwardly so as to force the roller 27 into close engagement with the glass 18.

It will be seen that when it is desired to remove the water that may be on the outer face of the glass, it will only be necessary for the operator to grasp the handle of the wiper, then move the same horizontally, which will cause the felt ring to move over the outer surface of the glass, thereby wiping the water or other foreign matter from the face thereof, so that the operator of the car may see through the glass without difficulty. When the wiper is not in operation it may be placed in such a position, that the reflection of an approaching automobile may be observed through the colored celluloid member in the pivoted frame. It will be seen that by the vertical adjustment of the roller plate that the rollers may be adjusted to various shapes of wind shield frames, also that by means of the thumb screw 31, the roller 27 may be so adjusted to increase the pressure of the felt ring 15 on the outer surface of the glass 18.

The colored transparent member 14 is primarily intended to be adjustably located between the strong light of an approaching light of an automobile and the eye of the driver of the car to which the device is attached, thereby eliminating the glaring light, and permitting the driver to plainly see the road and other objects ahead of him.

The invention having been set forth, what is claimed as new and useful is.

A wind shield wiper comprising a U-shaped member adapted to engage the upper rail of a wind shield so that one member will be disposed on each side of the same, one member being provided with a horizontally pivoted glass wiping member adapted to wipe the outer surface of the wind shield, the other member being provided with a vertically adjustable plate, said plate having a roller at its upper end to engage the upper rail of a wind shield frame, a roller carried by the lower end of the plate and adapted to engage the wind shield glass and means whereby the lower roller may be forced into close engagement with the glass whereby the pivoted wiper will be forced into closer engagement with the outer surface of the glass.

In testimony whereof I hereunto affix my signature.

SIMON P. JOHNSON.